Jan. 3, 1956  G. A. LYON  2,729,511
WHEEL COVER
Filed Dec. 24, 1952
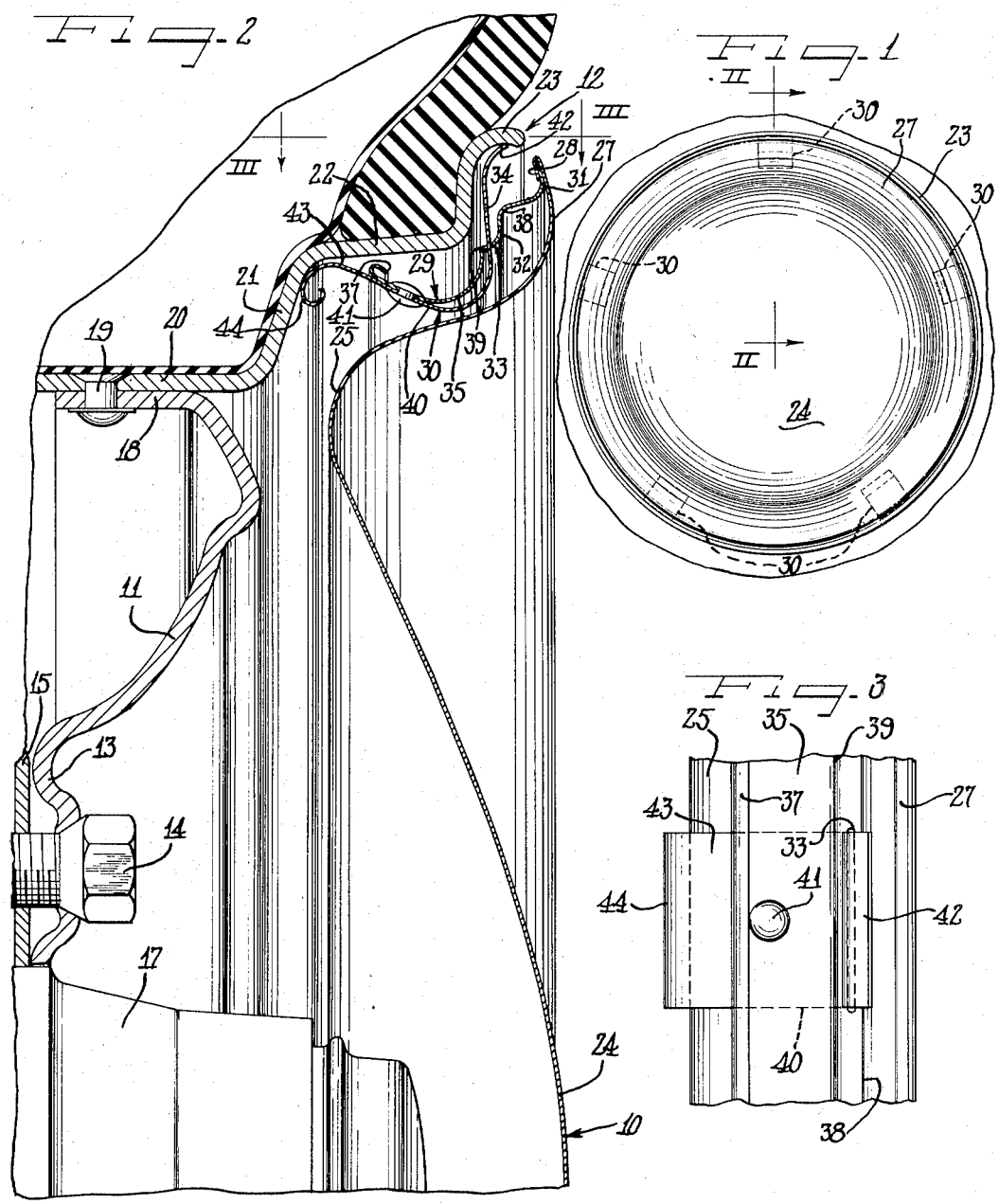
Inventor
George Albert Lyon

2,729,511
WHEEL COVER

George Albert Lyon, Detroit, Mich.

Application December 24, 1952, Serial No. 327,782

7 Claims. (Cl. 301—37)

The present invention relates to improvements in wheel structures and more particularly concerns the ornamental and protective covering of the outer sides of vehicle wheels.

An important object of the present invention is to provide a wheel structure having improved self-retaining cover structure at the outer side thereof.

Another object of the invention is to provide an improved wheel cover having self-retaining finger clip structure.

A further object of the invention is to provide in a wheel cover improved retaining means for engagement with the tire rim of a vehicle wheel.

Other objects, features and advantages of the present invention will be readily apparent from the following detailed description of a preferred embodiment thereof taken in conjunction with the accompanying drawings, in which:

Figure 1 is a side elevational view of a wheel embodying features of the present invention;

Figure 2 is an enlarged radial sectional view taken substantially on the line II—II of Figure 1; and Figure 3 is a fragmentary side elevational view of the cover as taken substantially in the plane of line III—III of Figure 2.

According to the present invention a cover 10 is applied to the outer side of a vehicle wheel comprising a wheel body 11 and a tire rim 12. The wheel body may be of the disk spider type having a central bolt on flange 13 secured as by means of attachment bolts 14 to a hub flange 15 and comprising part of a vehicle hub 17 that projects through the customary central aperture in the wheel body 11.

At its outer margin the wheel body 11 has a generally axially inwardly extending flange 18 that is secured in suitable fashion as by means of rivets 19 to a base flange 20 of the tire rim. From the base flange the tire rim has extending a generally radially outwardly and axially outwardly sloping side flange 21 merging with an intermediate flange 22 that extends axially outwardly and slopes generally radially outwardly and merges with a terminal flange 23 which projects generally radially outwardly and then has a portion extending generally axially outwardly.

The cover 10 is preferably of the full disk type comprising a sheet metal plate 24 of a size to substantially cover the tire rim and the wheel body and appropriately shaped with a central crown portion, an intermediate annular transversely dished portion 25 merging with an outer annular rib-like marginal portion 27 having a reversely bent underturned reenforcing and finishing flange 28. The annular portion 27 is dimensioned to overlie the terminal flange 23 of the tire rim, and the dished intermediate portion is dimensioned to extend toward juncture of the wheel body and the tire rim but to remain in assembly with the wheel in spaced relation to the side flange 21, while the radially outer side wall defining the portion 25 is arranged to lie in substantial spaced relation radially inwardly from the intermediate flange 22.

For retaining the cover 10 on the wheel, means are provided behind the marginal portion 27 of the cover for retaining engagement with the tire rim. To this end, an annular ring flange member 29 is provided for supporting an annular series of spaced retaining spring clip fingers 30. The ring member 29 may comprise a rolled section including an outer marginal flange 31 which is nested behind the marginal extremity of the marginal portion 27 of the cover and secured in place by means of the flange 28 turned into clamping relation thereto. From the marginal flange 31, the ring member extends generally axially inwardly to a radially inwardly directed intermediate flange portion 32 which at its inner margin is turned axially inwardly and has an annular series of spaced slots 33 therethrough through which respective spring legs 34 of the retaining fingers 30 extend. From the inner extremity of the flange 32 the ring member 29 extends angularly radially inwardly and then turns generally axially inwardly and preferably slopes radially outwardly to provide an arcuately cross-section rib-like body flange 35 having at its inner terminus a return bent radially and axially outwardly directed reenforcing and finishing flange 37. Thus, the ring member 29 is cross-sectioned to extend about the terminal and intermediate flanges of the tire rim in spaced relation. It will also be observed that the ring member 29 by virtue of its sinuous cross-section is provided with a plurality of annular reenforcing rib formations including an annular rib 38 radially and axially outwardly from the clip legs 34 and a reenforcing rib 39 at the axially inner side of the slots 33.

Herein the retaining finger members 30 include in addition to the retaining spring legs 34, a loop-like body 40 having a portion thereof secured as by means of a rivet 41 to the axially inner portion of the body flange 35 of the ring member, and with an arcuate portion of the finger body looped in spaced relation to the ring body 35 in the space between the ring and the adjacent portion of the cover.

The retaining finger legs 34 extend freely through the respective slots 33 so that the spring legs can move longitudinally within the slots 33, but the slots are narrower and thus afford only very limited range of movement normal to the width of the fingers 34.

As will be best appreciated from Figures 1 and 3 the retaining spring finger members 30 are of substantial width. These finger members are preferably made from a suitable gauge of spring steel having a high degree of hardness and resiliency. As a result, the spring finger members are capable of substantial resilient flexing without taking a set.

Each of the retaining legs 34 extends preferably radially beyond the peripheral extremity of the cover and to an initial diameter at their extremities slightly greater than the inside diameter of the axially extending portion of the terminal flange 23. At their extremities retaining finger legs 34 are preferably biased or turned slightly axially outwardly and provide retaining terminals 42 engageable endwise into cover retaining engagement with the terminal flange 23.

To apply the cover to the outer side of the wheel, it is generally centered with respect to the wheel and pressed axially inwardly. Thereby the turned retaining terminal portions 42 of the retaining spring fingers cam inwardly on the edge of the terminal flange 23 and snap into biting retaining engagement under substantial resilient stress against the inner face of the terminal flange. By having the intermediate portions of the retaining finger legs 34 extending through the slots 33, short leverage for snapping the cover into place is applied to the finger legs, while a full range of longitudinal flexing of the retaining finger leg and contiguous body loop portion of the finger is permitted by virtue of the free longitudinal movement through the respective slots 33.

For prying the cover from the wheel, a pry-off tool is adapted to be applied behind the reenforced outer edge of the cover and by appropriate leverage while fulcruming the pry-off tool against the edge of the terminal flange of the tire rim, the cover can be stressed outwardly, and the pry-off tool then progressively moved inwardly to engage the respective ribs 38 and 39 of the ring member 29. During this pry-off action, the adjacent retaining fingers 42 can turn flexibly and thus release the cover for dislodgment from the wheel. During this pry-off action the inner edges defining the slots 33 exert pry-off leverage to the intermediate portion of the legs 34 and thus shorten the leverage force on the leg while nevertheless permitting free longitudinal flexing of the leg 34 as is desirable.

In order to maintain the cover in floating spaced relation to the wheel, the retaining spring finger clip members 30 are provided with stop leg extensions 43 from the inner extremities of the bodies 40. The stop extensions 43 project generally axially inwardly substantially beyond the inner extremity of the rim member 29 and have generally radially inwardly and axially outwardly curled, axially inwardly facing abutment shoulder pad extremities 44 which are engageable with the side flange 21 of the tire rim. In view of the resilient flexibility of the clip fingers 30, the stop legs 43 are resiliently yieldable upon axially inward pressure against the cover, but will promptly spring back to normal position upon release of the pressure. Thereby the leg extensions 43 serve not only as resilient cushions for the cover, and spacer means, but also serve to maintain the retaining legs 34 under resilient retaining tension in an axial outward direction.

By having the stop legs 43 angled radially outwardly toward the base portion of the intermediate flange 22, limit upon radial displacement of the cover is afforded by the legs 43, supplemental to the retaining legs 34 which normally engage under resilient tension radially outwardly against the tire rim. The cover is thereby supported in full floating, cushioned, firmly retained relation upon the wheel.

It will be understood that modifications and variations may be effected without departing from the scope of the novel concept of the present invention.

I claim as my invention:

1. In a wheel structure including a tire rim having a plurality of angularly related flanges including a side flange and a terminal flange, a cover for disposition at the outer side of the wheel comprising a circular cover member having behind the margin thereof a flange structure directed generally radially and axially inwardly, said flange structure having thereon a series of retaining spring finger members secured to the radially inner side of the flange structure and having retaining spring legs of substantial width disposed with their major dimension circumferentially of the cover and projecting through circumferentially elongated apertures in the flange structure, said spring legs being resiliently flexible in axial direction and directed generally radially outwardly and engageable retainingly with the tire rim terminal flange.

2. In a wheel structure including a tire rim having a plurality of angularly related flanges including a side flange and a terminal flange, a cover for disposition at the outer side of the wheel comprising a circular cover member having behind the margin thereof a flange structure directed generally radially and axially inwardly, said flange structure having thereon a series of retaining spring finger members secured to the radially inner side of the flange structure and having retaining spring legs projecting through apertures in the flange structure and directed generally radially outwardly and engageable retainingly with the tire rim terminal flange, said spring finger members also having generally axially inwardly extending stop legs engageable resiliently against the side flange of the tire rim to maintain the cover in spaced relation to the wheel.

3. In a wheel structure including a tire rim having a plurality of angularly related flanges including a side flange and a terminal flange, a cover for disposition at the outer side of the wheel comprising a circular cover member having behind the margin thereof a flange structure directed generally radially and axially inwardly, said flange structure having thereon a series of retaining spring finger members secured to the radially inner side of the flange structure and having retaining spring legs projecting through apertures in the flange structure and directed generally radially outwardly and engageable retainingly with the tire rim terminal flange, said spring finger members also having generally axially inwardly extending stop legs engageable resiliently against the side flange of the tire rim to maintain the cover in spaced relation to the wheel, said stop fingers being angled toward an intermediate flange of the tire rim and serving to resist radial displacement of the cover.

4. In a cover for disposition at the outer side of a vehicle wheel, said cover comprising a member having an annular flange structure therebehind, said flange structure having on the radially inner side thereof a series of retaining spring finger members, said flange structure having respective apertures therethrough and said retaining spring finger members having resilient legs projecting through said apertures and engageable retainingly with a part of a wheel to which the cover may be applied, said retaining finger members having stop leg extensions projecting generally axially inwardly beyond said flange structure and turned generally radially inwardly for engagement with a part of the wheel to limit axial inward movement of the cover toward the wheel.

5. In a cover for disposition at the outer side of a vehicle wheel, a cover member having therebehind a substantially rigid ring portion, said ring portion having an extremity turned outwardly, and having in an intermediate portion respective peripherally extending narrow slots, and a plurality of retaining spring fingers secured to the radially inner side of the ring intermediate said turned extremity and said slots and having resilient legs projecting through said slots and stop legs extending beyond the turned extremity and having extremity portions turned inwardly.

6. In a cover for disposition at the outer side of a vehicle wheel, a circular cover member having an outer marginal portion, a generally axially extending flange behind said outer marginal portion having an angular cross-section comprising a pair of stiffening ribs with a flange portion therebetween, said flange portion having a circumferentially elongated narrow slot, and a retaining spring finger member secured to one side of said flange and having a resilient retaining leg cross-sectionally substantially complementary to and extending through said slot and substantially therebeyond, said leg being axially flexible for retaining engagement flexure tensioning relative to a wheel part, the opposite axial edges defining said slot providing rigid flexure fulcrums for the spring leg backed up by said ribs.

7. In a cover for disposition at the outer side of a vehicle wheel, a circular cover member having an outer marginal portion, a generally axially extending flange behind said outer marginal portion having an angular cross-section comprising a pair of stiffening ribs with a flange portion therebetween, said flange portion having a circumferentially elongated narrow slot, and a retaining spring finger member secured to one side of said flange and having a resilient retaining leg cross-sectionally substantially complementary to and extending through said slot and substantially therebeyond, said leg being axially flexible for retaining engagement flexure tensioning relative to a wheel part, the opposite axial edges defining said slot providing rigid flexure fulcrums for the spring leg backed up by said ribs, said spring finger member having a looped portion on the side of the flange to which the finger member is secured and affording substantial resilience for the spring finger leg for longitudinal movement in said slot coincident with said flexure tensioning of the leg.

References Cited in the file of this patent

UNITED STATES PATENTS

| Re. 22,042 | Lyon I | Mar. 3, 1942 |
| 1,832,003 | Colina | Nov. 17, 1931 |
| 2,006,639 | Horn | July 2, 1935 |
| 2,073,851 | Powell | Mar. 16, 1937 |
| 2,113,541 | Blank | Apr. 5, 1938 |
| 2,386,229 | Lyon II | Oct. 9, 1945 |
| 2,569,482 | Lyon | Oct. 2, 1951 |